United States Patent
Patel et al.

(10) Patent No.: US 8,258,086 B2
(45) Date of Patent: Sep. 4, 2012

(54) ANTI-SEIZE COMPOSITION WITH NANO-SIZED LUBRICATING SOLID PARTICLES

(75) Inventors: Prakash S. Patel, Algonquin, IL (US); Shabbir Attarwala, Simsbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 351 days.

(21) Appl. No.: 12/469,961

(22) Filed: May 21, 2009

(65) Prior Publication Data

US 2010/0298180 A1 Nov. 25, 2010

Related U.S. Application Data

(63) Continuation of application No. PCT/US2007/024481, filed on Nov. 28, 2007.

(60) Provisional application No. 60/872,131, filed on Dec. 1, 2006.

(51) Int. Cl.
- *C10M 125/02* (2006.01)
- *C10M 125/04* (2006.01)
- *C10M 113/08* (2006.01)
- *C10M 125/10* (2006.01)

(52) U.S. Cl. .................. 508/113; 508/150; 508/154

(58) Field of Classification Search .............. 508/113, 508/150, 154

See application file for complete search history.

(56) References Cited

U.S. PATENT DOCUMENTS

| | | | | |
|---|---|---|---|---|
| 4,314,924 | A | | 2/1982 | Haubennestel et al. |
| 4,715,972 | A | * | 12/1987 | Pacholke ............ 508/111 |
| 5,536,422 | A | * | 7/1996 | Oldiges et al. ......... 508/121 |
| 6,689,721 | B2 | | 2/2004 | Denpo et al. |
| 7,312,185 | B2 | * | 12/2007 | Willey et al. ........... 508/165 |
| 2003/0119681 | A1 | * | 6/2003 | Patel et al. ............. 508/150 |
| 2006/0122072 | A1 | * | 6/2006 | Erdemir et al. ......... 508/155 |
| 2007/0149413 | A1 | * | 6/2007 | Sasaki et al. ........... 508/219 |
| 2007/0254817 | A1 | * | 11/2007 | Griffo et al. ............ 508/363 |
| 2008/0234149 | A1 | * | 9/2008 | Malshe et al. ........... 508/150 |

FOREIGN PATENT DOCUMENTS

| | | |
|---|---|---|
| KR | 1020050051869 | 6/2005 |
| KR | 100614888 | 8/2006 |
| KR | 1020070035174 | 3/2007 |

OTHER PUBLICATIONS

International Search Report dated Apr. 30, 2008 for Application No. PCT/US2007/024481 filed Nov. 28, 2007.

\* cited by examiner

*Primary Examiner* — Jim Goloboy

(74) *Attorney, Agent, or Firm* — Steven C. Bauman

(57) ABSTRACT

An anti-seize composition includes lubricating solids and at least one of a material selected from a grease and an oil. The lubricating solids include at least 15 weight percent of nano-sized lubricating solid particles. The nano-sized lubricating solid particles each have at least one dimension, on average, of less than 500 nm.

4 Claims, No Drawings

ANTI-SEIZE COMPOSITION WITH NANO-SIZED LUBRICATING SOLID PARTICLES

BACKGROUND OF THE INVENTION

1. Field of the Invention

The present invention relates to anti-seize and/or lubricant compositions, particularly compositions including nano-sized particles.

2. Brief Description of Related Technology

An anti-seize composition is typically used to prevent metal-to-metal joints from seizing, galling or cold-welding. Seizing may occur when metal-to-metal joints are placed under fairly high loads and then subjected to reciprocal, relatively small-displacement movements. A lubricating composition is typically used to reduce the coefficient of friction between two sliding parts, thereby facilitating relatively large sliding movements between the parts. An anti-seize/lubricating composition, depending upon the specific application, may be used as an anti-seize composition, as a lubricating composition, or in both capacities. For example, an anti-seize/lubricating composition may act as a lubricating composition for a lightly loaded roller bearing. An anti-seize/lubricating composition may acts as an anti-seize composition with applied to a highly loaded threaded fastener subjected to load reversals. An anti-seize/lubricating composition may act in both capacities when parts, for example, gears, need to slide relative to one another when rotating and to transmit high loads when stationary. Anti-seize/lubricating compositions are available as liquids, pastes, solids and aerosols.

Anti-seize/lubricating compositions may be expected to operate under a variety of conditions, including, for instance, high loads, extreme temperatures, dirty and/or corrosive operating environments, etc. In addition, anti-seize/lubricating compositions may be expected to survive, for example, by not wearing off or by not breaking down, for relatively extended periods of time. Furthermore, anti-seize/lubricating compositions may be expected to operate without contaminating adjacent parts cause by, for example, simple physical transference or outgassing of volatile components. Anti-seize/lubricating compositions may also be expected to protect the surface of the individual parts, for example, by inhibiting or preventing corrosion. Additionally, anti-seize/lubricating compositions may be expected to have other, more esoteric characteristics, such as facilitating heat transfer, being non-toxic, working under extreme humidity conditions, etc.

Henkel Corporation manufactures and sells many anti-seize/lubricant compositions. For instance, C5-A Copper Anti-Seize is a suspension of copper and graphite in a high-quality grease, which protects metal parts from rust, corrosion, galling, and seizing at temperatures to 1800° F. (982° C.), and tested to MIL(PRF)-A-907-E. Nickel Anti-Seize is a copper-free product, recommended for stainless steel and other metal fittings to prevent corrosion, seizing, and galling in harsh, chemical environments, and temperatures to 2400° F. (1315° C.). Moly Paste is a low friction product, which lubricates press fits, protects during break-in and under high static loads up to 750° F. (400° C.). Silver Grade Anti-Seize is a temperature-resistant, petroleum-based inert lubricant compound fortified with graphite and metallic flake, which will not evaporate or harden in extreme cold or heat and is for use in assemblies up to 1600° F. (871° C.). Heavy Duty Anti-Seize is a metal free product, which provides excellent lubricity, outstanding lubrication to all metals including stainless steel, aluminum, and soft metals up to 2400° F. (1315° C.) Marine Grade Anti-Seize is formulated to protect assemblies exposed directly or indirectly to fresh and salt water. Marine Grade Anti-Seize works well in high humidity conditions, and has excellent lubricity, superior water wash-out and water spray resistance, and prevents galvanic corrosion, protects in temperatures from −29° C. to 1315° C. (−20° F. to 2400° F.). Graphite-50 Anti-Seize is an electrically conductive, non-metallic product, which is temperature resistant up to 900° F. (482° C.). Moly-50 Anti-Seize is a thread lubricant, which is temperature resistant to 750° F. (400° C.) and provides excellent lubricity. Zinc Anti-Seize protects aluminum and ferrous surfaces from seizure and corrosion up to 750° F. (400° C.). Food Grade Anti-Seize prevents seizure, galling, and reduces friction of stainless steel and other metal parts up to 750° F. (400° C.). N-1000 High Purity Anti-Seize is a copper-based product, which is suitable for long-term, stainless steel applications and high-nickel, alloy bolting. N-5000 High Purity Anti-Seize is a nickel-based product is recommended for highly corrosive environments to 2400° F. (1315° C.). High Performance N-5000 High Purity Anti-Seize, a nickel-based product, is temperature resistant to 2400° F. (1315° C.). N-7000 High Purity Anti-Seize is a metal-free product, which provides high levels of purity. White Hi-Temp Anti-Seize is a non-metallic product which protects against high temperature seizing and galling of mated metal parts, up to 2000° F. (1093° C.), while demonstrating excellent lubricity and use on various metals, such as copper, brass, cast iron, steel and all alloys including stainless steel.

None of these known anti-seize/lubricating compositions include nano-sized lubricating solid particles. A nano-sized particle is a microscopic particle whose size is measure in nanometers (nm), generally with at least one dimension being less than 500 nm. Nano-sized particles typically exhibit properties different from the properties of the bulk material or the material in a particle size larger than nano-size. One explanation for this is that as particles decrease in size surface characteristics of the material begin to dominate, possibly because the percentage of atoms at the surface becomes significant.

Nano-sized particles may be made from a wide variety of materials, including, by way of non-limiting example, carbon, metals, and ceramics. Carbon black is an example of a nano-sized particle that has been used for many years. Nanotubes made of carbon, boron and nitrogen are known. Pure metal nano-sized particles, such as silver or platinum find used as catalysts. Ceramics may include metal oxides, such as titanium, zinc, aluminum and iron oxides, or silicates or silicon oxides, such as day. In addition, nano-sized particles may be formed of one or more materials. For example, nano-sized particles may be coated or chemically modified to make them more or less hydrophilic, or nano-sized particles may be doped, i.e., a dopant element such as boron, phosphorous, and arsenic, to name a few, may be incorporated into the base material.

Nano-sized particles may be formed using a wide variety of techniques, including, by way of non-limiting examples, chemical or physical vapor deposition, physical vapor synthesis, reactive sputtering, electro-deposition, laser pyrolysis, laser ablation, spray conversion, mechanical alloying, sol gel techniques, supercritical fluid precipitation and solid-state processes such as grinding or milling.

Nano-sized particles may come in a wide variety of forms, including, by way of non-limiting example, powders, crystals, flakes, nanotubes, nanowires, nanospheres. Nano-sized particles may be nano-sized in all three dimensions, in two dimensions, or only in one dimension. Thus, for example, metal oxide ceramic nano-sized powders may be roughly the same size (ranging from 2-3 nm up to 200-300 nm) in all three dimensions. Silicate nano-sized particles may form flakes having a thickness on the order of 1 nm and width dimensions on the order of 100-1000 nm. And carbon nanotubes, multi-walled or single walled, may have diameters on the order of 0.5-50 nm, but with lengths ranging from a few hundred nanometers to a micron or more.

Conventional lubricants typically have relatively low percentages of lubricating solids (on the order of 5-10%). Under extreme pressure conditions, the lubricating solids may squeeze out from between the working parts, allowing detrimental metal-to-metal contact. Alternatively, at elevated temperatures (on the order of 300-600° F.), the oil or grease may burn off, leaving only the lubricating solids to act as a barrier between the working parts. Under these conditions, lubricants having relatively low percentages of lubricating solids may also allow detrimental metal-to-metal contact.

Despite the state of the technology, no anti-seize and/or lubricating compositions have been described or placed on the market with nano-sized lubricating solid particles. There is however a need for anti-seize and/or lubricating compositions formulated with nano-sized lubricating solid particles to take advantage of the unique surface-driven characteristics of the nano-sized particles.

SUMMARY OF THE INVENTION

In one aspect of the present invention, there is provided an anti-seize composition that includes lubricating solids and at least one of a material selected from a grease and an oil. The lubricating solids include at least 15 weight percent of nano-sized lubricating solid particles, desirably at least 20 weight percent of nano-sized particles. The nano-sized lubricating solid particles each have at least one dimension, on average, of less than 500 nm.

In another aspect of the present invention, the nano-sized lubricating solid particles may each have at least one dimension, on average, of less than 100 nm, desirably less than 50 nm.

In another aspect of the present invention, the nano-sized lubricating solid particles may include metallic particles. In one aspect, the metallic particles may include at least one of a material selected from copper, aluminum, nickel and alloys and combinations thereof. In one aspect, the nano-sized lubricating solid particles may include at least one of a material selected from graphite, molybdenum disulfide, tungsten disulfide, zirconium oxide, cerium oxide, tin oxide, magnesium oxide, calcium oxide and combinations thereof.

In another aspect of the present invention, the nano-sized lubricating solid particles may include amorphous nanoparticles, nanopowders, nanotubes, nanocrystals, and combinations thereof, which may be constructed of non-metallic materials, such as polytretrafluoroethylene and mica.

In another aspect of the present invention, the grease may include a mineral oil thickened with at least one of a material selected from sodium, aluminum, calcium, lithium and combinations thereof. In one aspect, the grease may include an oil thickened with at least one of a material selected from a bentonite clay, a silica, a polymer and combinations thereof. In one aspect, the grease may include a synthetic oil thickened with at least one of a material selected from a silica, a polymer, a metallic soap and combinations thereof.

In another aspect of the present invention, the oil may include at least one of a material selected from a mineral oil, a synthetic oil and combinations thereof. Here, the synthetic oil may include at least one material selected from a silicone, an ester, an olefin, a glycol, a polybutene and combinations thereof.

In another aspect of the present invention, the anti-seize composition may include at least one polymeric thickener, such as a polyamide.

The inventive composition may be in liquid form; the composition may be in aerosol form; the composition may be in paste, or the composition may be in stick form.

In another aspect of the present invention, the composition may include at least one suspending agent. In one aspect, the suspending agent may include a silica.

In another aspect of the present invention, the anti-seize composition may include at least one additive selected from the group consisting of an anti-corrosion additive, an extreme pressure additive, and an antioxidant additive.

In another aspect of the present invention, the composition may have a Mil-907-E breakaway torque ranging from 50 to 200 foot-pounds.

In another aspect of the present invention, a method of preparing a composition useful for anti-seize and/or lubricating purposes is provided. The method includes selecting a lubricating solid having at least 15 weight percent of nano-sized lubricating solid particles, wherein the nano-sized lubricating solid particles each have at least one dimension, on average, of less than 500 nm. The method further includes selecting at least one grease or an oil and mixing the lubricating solid with the at least one of a grease or an oil.

In another aspect of the present invention, a method of using a composition useful for anti-seize and/or lubricating purposes is provided. The method includes obtaining an anti-seize/lubricating composition including lubricating solids and at least one of a material selected from the group consisting of a grease and an oil, wherein the lubricating solids include at least 15 weight percent of nano-sized lubricating solid particles, and where the nano-sized lubricating solid particles each have at least one dimension, on average, of less than 500 nm. The method further includes applying a portion of the anti-seize/lubricating composition onto a surface and matingly engaging the surface with a complementary surface.

DETAILED DESCRIPTION OF THE INVENTION

The present invention is directed to anti-seize/lubricating compositions and to methods of preparing and using a composition useful for anti-seize and/or lubricating purposes.

The anti-seize/lubricating composition of the present invention includes lubricating solids that incorporate nano-sized lubricating solid particles. It is expected that utilizing nano-sized lubricating solid particles in lubricating solids will lend improved properties to the anti-seize/lubricating compositions, such as superior lubricity and superior torque tension controlling properties, which may result in more uniform clamping loads on assembly joints. This may prove to be particularly useful in critical boiling applications such as nuclear power plants, fossil fuel plants, aerospace applications and refineries.

As used in herein, a nano-sized particle is defined as a particle with at least one dimension being less than 500 nm. The present invention also encompasses agglomerates of nano-sized particles, i.e. clumps of one or more nano-sized particles, as long as most of the surface area of the individual nano-sized particles is maintained. Average particle dimension of the nano-sized particles may range from 0 to 500 nm. It is expected that average particle dimensions may typically range from 10 to 200 nm, and more typically, from 20 to 100 nm.

An anti-seize/lubricating composition of the present invention includes lubricating solids. A lubricating solid may be any particulate matter that decreases the coefficient of friction between sliding parts. Although lubricating solids may not provide as low a friction coefficient as can be obtained with fluid films, in general, lubricating solids are relatively independent of the relative speed of the sliding parts. Thus, for example, lubricating solids can be effectively used for relatively slow sliding speeds of the parts, for reciprocating motion of the sliding parts and when relatively heavy loads are applied to the sliding parts. Lubricating solids also typically remain more effective at elevated temperatures than do liquid lubricants. Unlike liquid lubricants, which may burn off at elevated temperatures thereby leaving the sliding parts without lubrication or with greatly reduced lubrication, lubricating solids remain in place and continue to provide lubrication at these elevated temperatures. Lubricating solids also generally provide excellent boundary lubrication, as compared to liquid lubricants, staying in place and not migrating or being squeezed out from between the sliding parts.

Lubricating solids may be metallic or non-metallic lubricants, and may be provided in a powder, particulate or flake form. Typically, it is desirable that these lubricating solids having high melting points.

Typical lubricating solids may include, by way of non-limiting examples, copper, aluminum, nickel, graphite, molybdenum, molybdenum disulfide, tungsten disulfide, zirconium oxide, cerium oxide, boron nitride, polytetrafluoroethylene, mica, calcium oxide, calcium fluoride, zinc oxide, tin oxide, magnesium oxide, and/or any combination of the above. The selection of the specific lubricating solid(s) will depend upon the desired end properties of the anti-seize/lubricating composition. Properties that may influence the selection of lubricating solids include, by way of non-limiting examples, desired temperature resistance, thermal conductivity, lubricity, chemical reactivity, and chemical resistance of the composition, the material properties of the working parts and cost. For example, copper as a lubricating solid would typically not be desired when there is the possibility that the anti-seize/lubricating composition would be exposed to ammonia, as in some chemical processing plants, or to platinum catalysts, as in some refinery operations. For these applications, by way of non-limiting example, nickel, graphite and/or calcium oxide as the lubricating solid(s) may be preferred. As another non-limiting example, nickel or calcium oxide may be used for extreme high-temperature applications (up to 2400° F.); while molybdenum disulfide may be more appropriate for less extreme high-temperature applications (up to about 750° F.).

Not all solids in flake, particulate or powder form may be considered to be lubricating solids. In particular, certain fillers used in known grease formulations may have relatively poor lubricating properties. For example, silica gels, carbon black and bentonite clay have poor lubricity, but are provided in some grease formulations as thickeners and, possibly, to provide higher temperature resistance. Carbon black may also be provided to improve the conductivity of the grease. These known grease thickeners (i.e. silica gels, carbon black and bentonite clay) are specifically excluded from the definition of lubricating solids as used herein.

An anti-seize/lubricating composition of the present invention includes a material selected from the group consisting of a grease and an oil. Thus, the composition may include a grease. Greases are semi-fluid, semi-solid materials typically used to deliver a lubricant. Grease generally consists of a thickener and a liquid lubricant dispersed within the thickener. The manufacture of grease typically involves a chemical reaction. For example, a soap-based grease may be a mixture of a fluid lubricant, usually a petroleum oil or a synthetic oil, dispersed in a soap thickener. Soap thickeners may be formed by reacting, i.e. saponifying, a metallic hydroxide, or alkali, with a fat, fatty acid, or ester. The type of soap used depends on the grease properties desired. Calcium (lime) soap greases are highly resistant to water, but unstable at high temperatures. Sodium soap greases are stable at high temperatures, but wash out in moist conditions. Lithium soap greases resist both heat and moisture. Mixed-base soap is a combination of soaps, presumably offering some of the advantages of each type. A complex soap is formed by the reaction of an alkali with a high-molecular-weight fat or fatty acid to form soap, and the simultaneous reaction of the alkali with a short-chain organic or inorganic acid to form a metallic salt (the complexing agent). Complexing agents usually increase the dropping point of grease. Lithium, calcium, and aluminum greases are common alkalis in complex-soap greases. Non-soap thickeners, such as clays, silica gels, carbon black and various synthetic organic materials may also be used in grease manufacture. Any of various liquid lubricants or base oils may be dispersed within the thickener. Commonly, a mineral oil, a synthetic oil, or a vegetable oil is used depending upon the application.

Consistency or penetration of grease is a measure of the consistency of grease, utilizing a penetrometer. Penetration is reported as the tenths of a millimeter (penetration number) that a standard cone, acting under the influence of gravity, will penetrate the grease sample under test conditions prescribed by test method ASTM D 217. Standard test temperature is 25° C. (77° F.). The higher the penetration number, the softer the grease. Undisturbed penetration is the penetration of a grease sample as originally received in its container. Unworked penetration is the penetration of a grease sample that has received only minimal handling in transfer from its original container to the test apparatus. Worked penetration is the penetration of a sample immediately after it has been subjected to 60 double strokes in a standard grease worker; other penetration measurements may utilize more than 60 strokes. Block penetration is the penetration of block grease (grease sufficiently hard to hold its shape without a container).

Various additives may be added to greases to improve or modify their characteristics. For example, additives may be used to provide or improve dropping point, thermal stability, shear stability, resistance to water washout, antioxidant or oxidation stability, corrosion resistance, and anti-wear properties.

In addition, in some instances, lubricating solids are incorporated into some standard grease formulations. For example, a food grade grease may contain around 5 weight percent or less of zinc oxide. As another example, an extreme pressure (EP) grease may contain around 5 weight percent or less of molybdenum sulfide. In these examples, both the zinc oxide and the molybdenum sulfide act as lubricating solids.

Greases useful in forming the anti-seize/lubricating composition of the present invention may include, by way of non-limiting examples, at least a mineral oil and/or a synthetic oil. A mineral oil is an oil that is manufactured from crude oil that has undergone a variety of complex separation processes. A synthetic oil is an oil created by the chemical reaction of several ingredients, for example, esters and synthetic hydrocarbons. Synthetic oils include semi-synthetic oils, which are mixtures of synthetic oils and non-synthetic oils.

Greases useful in forming the anti-seize/lubricating composition of the present invention may also include, by way of non-limiting examples, an oil thickened with a bentonite clay, a silica and/or a polymer. Bentonite clay is a chemically (amine) treated clay. A Silicas refer to fumed silica. Typical polymers used for thickening grease include polyurea, fluorocarbon and polybutene.

Greases useful in forming the anti-seize/lubricating composition of the present invention may further include, by way of non-limiting examples, one or more mineral oils thickened with sodium, aluminum, calcium and/or lithium. Such metal-thickened mineral oils typically have minimum oil separation, higher dropping properties, good water resistance, oxidation stability and corrosion resistance, among other properties.

Other greases useful in forming the anti-seize/lubricating composition of the present invention may include, by way of non-limiting examples, one or more synthetic oils thickened with a silica, a polymer and/or a metallic soap. A metallic soap is formed by the neutralization of a weak fatty acid by a strong base, in a processes known as saponification. Metallic soap thickened, synthetic oil greases are particularly useful for low- as well as high-temperature resistance applications. Polymer thickened, synthetic oil-based greases include polyurea greases, which are particularly useful as ball bearing greases. As would be appreciated by person of ordinary skill in the art, other greases, as may be suitable for a specific application, may be used without departing form the spirit of the invention.

The anti-seize/lubricating composition of the present invention may include an oil. The oil serves to control, in part, the spreadability of the composition. Useful oils include petroleum oils, mineral oils, and synthetic oils, such as silicone oils, ester-based oils, olefin-based oils, glycol oils, polybutene-based oils, and the like. Various additives may be added to the oils to improve or modify their characteristics. As with the greases described above, additives may be used to provide or improve antioxidant, anticorrosion, and anti-wear properties, among other properties.

Oils useful in forming the anti-seize/lubricating composition of the present invention may further include, by way of non-limiting examples, a synthetic oil which includes one or more silicones, esters, olefins, glycols and/or polybutene. Silicon-based synthetic oils generally have excellent oxidation and viscosity stability. Ester-based synthetic oils generally have good fire resistance. Olefin-based synthetic oils generally have good lubricity. Glycol-based synthetic oils are generally have no effect on rubber gaskets. Polybutene-based synthetic oils are generally clean burning without residue. As would be appreciated by person of ordinary skill in the art, other oils may be used without departing form the spirit of the invention.

The lubricating solids of the present invention include nano-sized lubricating solid particles. Nano-sized particles or nanoparticles are characterized as particles having at least one dimension of less than 500 nm. Notably, it appears that novel properties differentiating nanoparticles from bulk material develop at this critical length scale. The measured dimension corresponds to a structural feature such as a width, length, height, thickness, diameter, etc. of the particle. These characteristic dimensions of nano-sized particles may be measured using any suitable method, including for example, dynamic light scattering (DLS), photon correlation spectroscopy (PCS), quasi-elastic light scattering (QELS) or X-Ray Diffraction (XRD). Additionally, scanning probe microscopes (including atomic force microscopes (AFM)) may be used to determine the average dimensions of the nano-sized particles. An AFM can easily measure particle dimensions of greater than 100 nm, and can measure particle dimension of from 1 to 100 nm with special considerations.

The lubricating solids of the inventive anti-seize/lubricating compositions include nano-sized lubricating solid particles in an amount greater than 15 weight percent based on the total weight of the lubricating solids. In this aspect, the weight of the lubricating solids does not include the weight of the grease and/or oil, themselves, or any non-lubricating additives to the grease and/or oil. Thus, grease thickeners, such as carbon black or silica gels, which may include solid particles, are not included in the weight of the lubricating solids. However, when the grease and/or oil are supplied with some percentage of lubricating solids, such as the zinc oxide lubricating solid discussed above with respect to certain food grade greases and the molybdenum sulfide lubricating solid discussed above with respect to certain extreme pressure greases, these pre-mixed lubricating solids are included in the total weight of the lubricating solids.

When the amount of nano-sized lubricating solid particles in the lubricating solids is at or above about 15 weight percent of the lubricating solids, it is expected that the characteristics of the lubricating solids, will begin to be influenced by the characteristics of the nano-sized particles. At or above about a 20 weight percent of nano-sized particles in the lubricating solids, it is expected that the effects of the nano-sized lubricating solid particles will be even more pronounced. When nano-sized lubricating solid particles comprise from 30 to 40 weight percent of the lubricating solids, given the present costs associated with nano-sized particles, it is expected that the maximum cost benefit of including nano-sized lubricating solid particles in the lubricating solids will have been exceeded. As is appreciated by a person of ordinary skill in the art, the remaining weight percent of the lubricating solids may be made up of conventional particles or other solid materials, without limitation. In the limiting case, for special applications, up to 100 weight percent of the lubricating solids may be comprised of nano-sized lubricating solid particles.

In the anti-seize/lubricating composition of the present invention, the nano-sized lubricating solid particles of the lubricating solids may include metallic or non-metallic particles. Non-limiting examples of nano-sized metallic particles include copper, aluminum, and nickel. Other useful nano-sized lubricating solid particles may include graphite, molybdenum, molybdenum disulfide, tungsten disulphide, zirconium oxide, cerium oxide, tin oxide, magnesium oxide, calcium oxide, mica, and combinations thereof.

The nano-sized lubricating solid particles may be of any form, including, nanopowders, nanotubes, nanocrystals, and combinations thereof. Nanopowders, as used herein, are powders composed of nano-sized particles having an average diameter below 50 nm. The individual particles of nanopowders are generally free to move in relationship with each other and, accordingly, when not in liquid suspension resemble smoke particles. Nanotubes can be multi-walled generally cylindrical particles or single-walled generally cylindrical particles. They typically have a diameter-to-length ratio from about 5 to 20, although they are not limited to these ratios. A nanocrystal is a crystalline material, as opposed to amorphous, with dimensions measured in nanometers. Nanocrystals can be inorganic, for example, composed of germanium, or organic, for example, composed of DAST (trans-4-[4-(dimethylamino)]stilbezolium-p-toluenesulfonate). Organic nanocrystals are basically an aggregate of organic molecules that are orderly arranged in alignment.

In one aspect of the present invention, the average characterizing dimension of the nano-sized particles may be considerably less than 500 nm. For example, the nano-sized particles may have at least one dimension, on average, of less than 100 nm. It may also be desirable to have even smaller nano-sized particles. As an example, the nano-sized particles may have at least one dimension, on average, of less than 50 nm. The smaller the average minimum dimension, the more surface area per unit volume of nano-sized particles, and thus the more likely that the nano-particles will exhibit properties dependent upon surface characteristics.

The present invention may also include certain additives, including but not limited to anti-corrosion, extreme pressure (EP), and antioxidant additives. Examples of commercially available additives include the anticorrosion additive: Vanlube® RI-BA, the extreme pressure additive: Molyvan® L, and the antioxidant additive: Vanlube® AZ, all supplied by R.T. Vanderbilt Co., Inc. of Norwalk, Conn.

Thickeners, plasticizers, pigments, dyes, diluents, fillers, and other agents common to the art can be employed in any reasonable manner to produce desired functional characteristics, providing they do not significantly interfere with the anti-seize/lubricating composition's functionality. By way of non-limiting example, the anti-seize/lubricating composition may include a polymeric thickener, which may include a polyamide, such as those commercially available as a non-reactive free flowing powder under the trade name DISPARLON® 6200 6100 and 6500 from King Industries Specialties Company of Norwalk, Conn. The recommended use in accordance with commercially available data sheets for DISPARLON® 6200 is for epoxy adhesive and potting compounds in amounts of about 0.5% to about 3% by weight; the recommended use in accordance with commercially available data sheets for DISPARLON® 6500 is for epoxy adhesive and potting compounds in amounts of about 0.5% to about 3% by weight.

When present, the inventive compositions include the polymeric thickener in amounts of about 2.5% to about 20%, for instance about 5% to about 15%, such as about 7% to about 10%, by weight of the total composition. When present in these amounts, the non-flowability characteristics of a composition can be obtained with minimal undesirable effects, such as loss of substantial tensile properties or sealing characteristics. Additionally, these materials can be added directly in solid form, such as in powder or particulate form, without pre-melting of the particles or even heating of the polymerizable compounds. It is often practical, however, to slightly heat the polymerizable compounds before or after incorporating the polymeric thickener for the sake of expediency. This is not necessary to obtain the non-flowable characteristics but is used as a practical and expedient processing measure.

The polyamide materials of the present invention desirably have a particle size less than about 15 microns, although other particle sizes are useful. As previously mentioned, the melting or softening point of the polymeric thickener ranges from about 200° F. (93° C.) to about 500° F. (260° C.). In a particularly desirable embodiment, a polyamide having a melting point of about 250° F.-270° F. (121° C.-132° C.) and desirably about 260° F. (127° C.) is employed.

In addition, the polymeric thickener may further include polyamides, polyacrylamides, polyimides, and polyhydroxyalkylacrylates.

A more particular description of a urea-urethane includes a combination of an alkali metal cation and the reaction product of (a) a polyfunctional isocyanate and an hydroxy and an amine; or (b) a phosgene or phosgene derivative, and a compound having 3 to 7 polyethylene ether units terminated at one end with an ether group and at the other end with a reactive functional group selected from an amine, an amide, a thiol or an alcohol; or (c) a monohydroxy compound, a diisocyanate and a polyamine. When the reaction product described in (c) is employed it is generally formed by first reacting a monohydroxy compound with a diisocyanate to form a mono-isocyanate adduct, and subsequently reacting the mono-isocyanate reaction product with a polyamine in the presence of an alkali metal salt and aprotic solvent, as described in U.S. Pat. No. 4,314,924, the disclosure of which is hereby expressly incorporated herein by reference. A commercially available version of the reaction product described in (c) is believed to be BYK®-410, from BYK-Chemie, of Wallingford, Conn. BYK-Chemie describes this reaction product as a urea-urethane.

Useful isocyanates for forming the reaction product(s) of the additive include polyisocyanates such as phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl)cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for reacting with the polyisocyanates also include polyethyl glycol ethers having 3-7 ethylene oxide repeating units and one end terminated with an ether or an ester, polyether alcohols, polyester alcohols, as well as alcohols based on polybutadiene. The specific type of alcohol chosen and the molecular weight range can be varied to achieve the desired effect. Generally, monohydroxy compounds, straight or branched chain aliphatic or cyclic primary or secondary alcohols containing $C_{5-25}$, and alkoxylated derivatives of these monohydroxy compounds are useful.

Phosgene and phosgene derivatives, such as bischloroformates, may be used to make the reaction product of the additive (c). These compounds are reacted with a nitrogen-containing compound, such as an amine, an amide or a thiol to form the adduct. Phosgenes and phosgene derivatives may also be reacted with an alcohol to form the reaction product.

The alkali metal cations are usually provided in the form of a halide salt. For example, sodium, potassium and lithium halide salts are useful. In particular, sodium chloride, sodium iodide, sodium bromide, potassium chloride, potassium iodide, potassium bromide, lithium chloride, lithium iodide, lithium bromide and combinations thereof may be employed.

The reaction products of additive (c) of the present invention are usually present in and added to the composition with an alkali metal salt, in a solvent carrier. The solvents are desirably polar aprotic solvents in which the reaction to form the reaction product was carried out. For example, N-methyl pyrrolidone, dimethylsulfoxide, hexamethylphosphoric add triamide, N,N-dimethylformamide, N,N,N',N'-tetramethylurea, N,N-dimethylacetamide, N-butylpyrrolidone, tetrahydrofuran and diethylether may be employed.

One particularly desirable additive is the combination of a lithium salt and a reaction product which is formed by reacting a monohydroxy compound with a diisocyanate compound to form a monoisocyanate first adduct, which is subsequently reacted with a polyamine in the presence of lithium chloride and 1-methy-2-pyrrolidone to form a second adduct. A commercially available additive of this sort is sold by BYK-Chemie, of Wallingford, Conn. under the tradename BYK® 410. This commercially available additive is described by BYK-Chemie product literature as being a urea urethane having a minor amount of lithium chloride present in a 1-methyl-2 pyrrolidone solvent.

Amines which can be reacted with phosgene or phosgene derivatives to make the reaction product include those which conform to the general formula $R^{11}$—$NH_2$, where $R^-$ is aliphatic or aromatic. Desirable aliphatic amines include polyethylene glycol ether amines. Desirable aromatic amines include those having polyethylene glycol ether substitution on the aromatic ring.

For example, commercially available amines sold under the tradename JEFFAMINE® by Huntsman Corporation of Houston, Tex., may be employed. Examples include JEFFAMINE® D-230, JEFFAMINE® D-400, JEFFAMINE® D-2000, JEFFAMINE® T-403, JEFFAMINE® ED-600, JEFFAMINE® ED-900, JEFFAMINE®D ED-2001, JEFFAMINE® EDR-148, JEFFAMINE® XTJ-509, JEFFAMINE® T-3000, JEFFAMINE® T-5000, and combinations thereof.

The JEFFAMINE® D series are diamine based products and may be represented by:

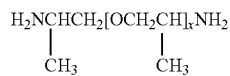

(CAS Registry No. 904610-0)

where x is about 2.6 (for JEFFAMINE® D-230), 5.6 (for JEFFAMINE® D-400) and 33.1 (for JEFFAMINE® D-2000), respectively.

The JEFFAMINE® T series are trifunctional amine products based on propylene oxide and may be represented by:

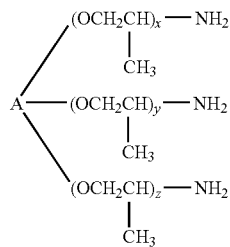

where x, y and z are set forth below in Table A.

TABLE A

| JEFFAMINE ® | | Approx. | |
|---|---|---|---|
| Product | Initiator (A) | Mol. Wt. | Mole % |
| T-403 | Trimethylolpropane | 440 | 5-6 |
| T-3000 | Glycerine | 3,000 | 50 |
| T-5000 | Glycerine | 5,000 | 85 |

More specifically, the JEFFAMINE® T-403 product is a trifunctional amine and may be represented by:

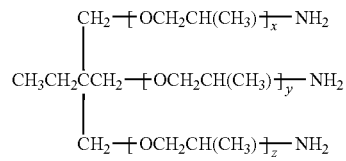

where x+y+z is 5.3. (CAS Registry No. 39423-51-3)

The JEFFAMINE® ED series are polyether diamine-based products and may be represented by:

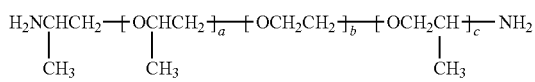

where a, b and c are set forth below in Table B.

TABLE B

| | Approx. | | |
| JEFFAMINE | Value | | Approx. |
| Product | B | a + c | Mol. Wt. |
|---|---|---|---|
| ED-600 | 8.5 | 2.5 | 600 |
| ED-900 | 15.5 | 2.5 | 900 |
| ED-2001 | 40.5 | 2.5 | 2,000 |

Amides useful for reacting with the phosgene or phosgene derivatives include those which correspond to the following formula:

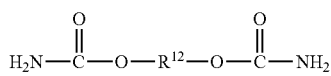

where $R^{12}$ may be an aliphatic or aromatic, substituted or unsubstituted, hydrocarbon or heterohydrocarbon, substituted or unsubstituted, having $C_{1-36}$.

Alcohols useful in forming the reaction product with the phosgene or phosgene derivatives include those described above.

Another polymeric thickener useful herein includes hydroxyl-, amine- or amide-modified aliphatic hydrocarbons and polyester-amide based rheological additives. Hydroxy-, amine- or amide-modified aliphatic hydrocarbons include THIXCIN® R, THIXCIN® GR, THIXATROL® ST and THIXATROL® GST, each of which available from Rheox Inc. of Hightstown, N.J. These modified aliphatic hydrocarbons are castor oil based materials. The hydroxyl modified aliphatic hydrocarbons are partially dehydrated castor oil or partially dehydrated glycerides of 12-hydrostearic add. These hydrocarbons may be further modified with polyamides to form polyamides of hydroxyl stearic acid, and are described as being useful polyamides.

Polyester-amide based rheolgical additives include THIXATROL® TSR, THIXATROL® SR and THIXATROL® VF rheological additives available from Rheox Inc., Hightstown, N.J. These rheological additives are described to be reaction products polycarboxylic adds, polyamines, alkoxylated polyols and capping agents. Useful polycarboxylic acids include sebacic acid, poly(butadiene)dioic acids, dodecane dicarboxylic add and the like. Suitable polyamines include diamine adkyls. Capping agents are described as being monocarboxylic acids having aliphatic unsaturation.

Optionally, the anti-seize composition may include at least one suspending agent which may include silica. The silica may be a fumed silica. An example of a fumed silica is Cab-O-Sil® M-5 by Cabot Corp. of Boston, Mass.

As shown in the examples below, the anti-seize/lubricating composition of the present invention may be manufactured in liquid, aerosol, paste, or stick form. The liquid formulation may, for example, be formed by mixing petroleum or synthetic oil with the lubricating solids, which include nano-sized particles. The aerosol formulation may, for example, be formed by diluting anti-seize paste having lubricating solids, which include nano-sized particles, with faster drying solvent and a propellant. The paste formulation may, for example, be formed by mixing grease and oil with lubricating solids, which include nano-sized particles. The stick formulation may, for example, be formed by mixing grease and oil with a polymeric thickener and with lubricating solids, which include nano-sized particles.

The anti-seize/lubricating composition may optionally have a Mil-907-E breakaway torque ranging form 50 to 200 foot-pounds.

One method for preparing the composition of the present invention could include the steps of (1) selecting a lubricating solid having at least 15 weight percent of nano-sized lubricating solid particles having least one dimension, on average, of less than 500 nm; (2) selecting a grease and/or an oil; (2) and mixing the lubricating solid with the oil and/or grease.

One method for using the composition of the present invention could include the steps of (1) selecting an anti-seize/lubricating composition having a grease and/or oil and lubricating solids, wherein the lubricating solids include at least 15 weight percent of nano-sized lubricating solid particles having at least one dimension of at least one structural feature of less than 500 nm, and (2) applying a portion of the anti-seize lubricating composition onto a surface and matingly engaging the surface with a complementary surface. Optionally, the surface may be a threaded surface.

Possible formulations of the composition of the present invention are presented below. The examples set forth below serve to illustrate the present invention, but in no way are intended to limit the spirit and scope thereof, which is defined by the following claims.

Copper Anti-Seize Formulation:

| Ingredients | Concentration, wt % |
|---|---|
| Mineral or synthetic oil-based grease | 30-60 |
| Mineral or synthetic oil | 10-40 |
| Thickener | 0-20 |
| Copper, lubricating solids | 10-40 of which at least 5 wt % of the copper lubricating solids are nano-sized particles |
| Graphite, lubricating solids | 10-40 of which 15-30 wt % of the graphite lubricating solids are nano-sized particles |
| Additives | 0-5 |

Aluminum Anti-Seize Formulation:

| Ingredients | Concentration, wt % |
|---|---|
| Mineral or sythetic oil based grease | 30-60 |
| Mineral or sythetic oil | 10-40 |
| Thickener | 0-20 |
| Aluminum lubricating solids | 10-40 of which from 0 to 15 wt % of the aluminum lubricating solids are nano-sized particles |
| Graphite lubricating solids | 10-40 of which at least 10 wt % of the graphite lubricating solids are nano-sized particles |
| Additives | 0-5 |

Nickel Anti-Seize Formulation:

| Ingredients | Concentration, wt % |
|---|---|
| Mineral or Synthetic oil based grease | 30-60 |
| Mineral or Synthetic oil | 10-40 |
| Thickener | 0-20 |
| Nickel lubricating solids | 10-40 of which at least 10 wt % of the nickel lubricating solids are nano-sized particles |
| Graphite lubricating solids | 10-40 of which 10-30 wt % of the graphite lubricating solids are nano-sized particles |
| Additives | 0-5 |

Moly Paste Anti-Seize Formulation:

| Ingredients | Concentration, wt % |
|---|---|
| Mineral or synthetic oil based grease | 30-60 |
| Mineral or synthetic oil | 10-40 |
| Thickener | 0-20 |
| Molybdenum disulfide lubricating solids | 20-60 of which 15-30 wt % of the molybdenum disulfide lubricating solids are nano-sized particles |
| Additives | 0-5 |

Non-Metallic Anti-Seize Formulation:

| Ingredients | Concentration, wt % |
|---|---|
| Mineral or synthetic oil based grease | 30-60 |
| Mineral or synthetic oil | 10-40 |
| Thickener | 0-20 |
| Calcium oxide lubricating solids | 10-40 of which at least 5 wt % of the calcium oxide lubricating solids are nano-sized particles |
| Graphite lubricating solids | 10-40 of which at least 10 wt % of the graphite lubricating solids are nano-sized particles |
| Additives | 0-5 |

Graphite Paste Anti-Seize Formulation:

| Ingredients | Concentration, wt % |
|---|---|
| Mineral or synthetic oil based grease | 30-60 |
| Mineral or synthetic oil | 10-40 |
| Thickener | 0-20 |
| Graphite lubricating solids | 20-60 of which 15-55 wt % of the graphite lubricating solids are nano-sized particles |
| Additives | 0-5 |

What is claimed:

1. A method of using a composition useful for anti-seize and/or lubricating purposes, the method comprising the steps of:
   obtaining an anti-seize/lubricating composition comprising at least one of a material selected from the group consisting of a grease and an oil; and
      11 percent to 80 percent by weight of composition of nano-sized lubricating solid particles, wherein said nano-sized lubricating solid particles each have at least one dimension, in average, of less than 500 nm;
   applying a portion of said anti-seize/lubricating composition onto a first surface; and
   matingly engaging said surface with a complementary second surface;
   wherein the first surface and the second surface remain stationary with respect to each other during use.

2. The method of claim 1 wherein the anti-seize/lubricating composition further comprises at least one polymeric thickener and wherein the composition is in stick form.

3. A method of using an anti-seize/lubricating composition, comprising the steps of:
   providing an anti-seize/lubricating composition in stick form comprising:
   at least one of a material selected from the group consisting of a grease and an oil:
      11 percent to 80 percent by weight of composition of nano-sized lubricating solid particles, wherein said nano-sized lubricating solid particles each have at least one dimension, on average, of less than 500 nm; and
   at least one polymeric thickener;
   applying a portion of the anti-seize/lubricating composition onto a first surface; and
   matingly engaging said surface with a complementary second surface;
   wherein the first surface and the second surface remain stationary with respect to each other during use.

4. The method of claim 3 wherein the step of applying comprises wiping a portion of the stick form anti-seize/lubricating composition against the first surface.

* * * * *